United States Patent [19]

Hammers et al.

[11] 4,339,754

[45] Jul. 13, 1982

[54] SPATIALLY ADAPTIVE MOVING TARGET INDICATOR SYSTEM FOR RADAR EQUIPMENT

[75] Inventors: David E. Hammers, Los Angeles; John M. Milan, Canoga Park, both of Calif.

[73] Assignee: International Telephone and Telegraph Corporation, New York, N.Y.

[21] Appl. No.: 972,736

[22] Filed: Dec. 26, 1978

[51] Int. Cl.³ .................................................. G01S 13/52
[52] U.S. Cl. ................................ 343/7.7; 343/5 NQ; 343/7 A; 343/18 E
[58] Field of Search ............................... 343/7.7, 5 NQ

[56] References Cited

U.S. PATENT DOCUMENTS

3,725,923  4/1973  Bosc et al. ............................ 343/7.7
4,053,884  10/1977  Cantrell et al. ....................... 343/7.7
4,132,990  1/1979  Domizio et al. ................... 343/7.7 X Primary Examiner—T. H. Tubbesing
Attorney, Agent, or Firm—William T. O'Neil

[57] ABSTRACT

A radar system is provided with first and second moving target indicator (MTI) systems. The first MTI system generally works better against ground clutter than against sky clutter. The second MTI system works well against sky clutter but generally requires a greater number of radar return echoes to discern targets in the sky clutter. A correlation estimation circuit is employed to calculate the correlation of clutter-like return echoes not suppressed by the first MTI system. If the return echoes are sufficiently correlated, the second MTI system is invoked against the clutter. If the return echoes are less well correlated, on the other hand, then electronic counter-counter measure systems may be invoked.

14 Claims, 9 Drawing Figures

FIG. 1

| TYPE OF DMTI SYSTEM | NO. PULSES NEEDED IN FILTER | CLUTTER REJECTION | | SIG. LOSSES OR GAINS | | | CONCLUSION |
|---|---|---|---|---|---|---|---|
| | | GROUND | SKY | ECLIP. LOSS | COH. | NON. COH. | |
| ZERO REF CANCELLER | 3 | VERY GOOD | POOR | POOR | — | 4.8 dB | APPLY WHEN ONLY GROUND CLUTTER EXISTS |
| DUAL OFFSET CANCELLERS | 5 | VERY GOOD | FAIR | FAIR | — | 3.0 dB | APPLY FOR GROUND AND MILD SKY CLUTTER |
| WT'D 8 PT FFT | 8 | VERY GOOD | VERY GOOD | MINIMAL | 7 dB* | 1.9 dB | IDEAL REJECTION OF GROUND & SKY CLUTTER WITH COHERENT GAIN ON TARGET |

*9 dB IDEAL GAIN WITH 2 dB LOSS ACCOUNTING FOR FILTER STRADDLE & SHAPE LOSSES

FIG. 2

FIG. 3 3D RADAR INSTRUMENTED COVERAGE

FIG. 4  3D RADAR SCAN PROGRAM

FIG. 9 AUTOCORRELATION ESTIMATOR CIRCUITS

SPATIALLY ADAPTIVE MOVING TARGET INDICATOR SYSTEM FOR RADAR EQUIPMENT

BACKGROUND OF THE INVENTION

The present invention relates to spatially adaptive moving target indication (MTI) electro magnetic detection systems and more particularly to a radar system using autocorrelation estimation techniques to control the level of performance of the MTI circuits both spatially and with respect to time.

The following discussion assumes that the reader has a basic familiarity with the operation of radar systems, particularly MTI and Digital MTI radars. For readers desiring more background information on such subjects, reference may be had to "Radar Handbook" edited by M. I. Skolnik and published by McGraw Hill Book Company (1970).

Moving target indication (MTI) radar systems make it possible to separate moving targets from fixed targets, utilizing the Doppler effect, with techniques well known in the prior art. MTI radars typically transmit periodic pulses and make use of the variations of the phase between the transmitted wave and the received echo wave from one pulse to another pulse to detect moving targets. In such radar systems, the phase of the transmitted wave is stored or remembered during each pulse repetition period and then compared with the phase of the echo signal. The relative phase is constant for one repetition period to the next repetition period for waves reflected from fixed targets, while the phase varies with time for the case of waves reflected from a target moving with a radial velocity greater than zero with respect to the antenna. A phase detector connected to compare the remembered phase reference signal for each repetition period with the received signal produces constant amplitude pulses for fixed targets and pulses whose amplitudes vary sinusoidally at a frequency FD (generally called the Doppler Frequency) for moving targets. The Doppler Frequency depends upon the radial velocity $V_R$ of a given moving target and upon the transmitted wavelength $\lambda$, according to the formula $FD = 2V_R/\lambda$.

The spectrum of the constant amplitude pulses corresponding to fixed targets consists of lines spaced at frequencies 0, F, 2F, 3F..., nF, wherein F is the transmitted repetition frequency (PRF). The spectrum of pulses corresponding to moving targets comprises spaced lines of the type $nF \pm FD$ where $n = 0, 1, 2, 3, \ldots$ In order to make a discrete velocity determination, it is necessary to know the return signal spectrum for a corresponding moving echo. The location of the echo, i.e., its bearing and range, are not derived from the spectrum. The echo bearing is taken at the antenna bearing at the time of reception of the pulses. The echo range is determined by the elapsed time between the echo transmission and the pulse reception.

In coherent pulse Doppler radar, it is desirable to provide processing of the phase discriminator circuit output signals to recover range information. For this purpose, the signal is subdivided into joined increments of range, called range bins, each corresponding to the signal returned from a discrete area located at a predetermined distance from the radar. The signal in each such bin may be analyzed for the presence or absence of a moving echo, such signal analysis consisting of the examination of the signal spectrum. Various approaches are available for this type of analysis, one of these consisting of computation of the Fourier transform of the signal and another consisting of filtering the signal with a filter having notches at 0, F, 2F, 3F, ... such that the response from fixed targets is excluded.

Figure 1:
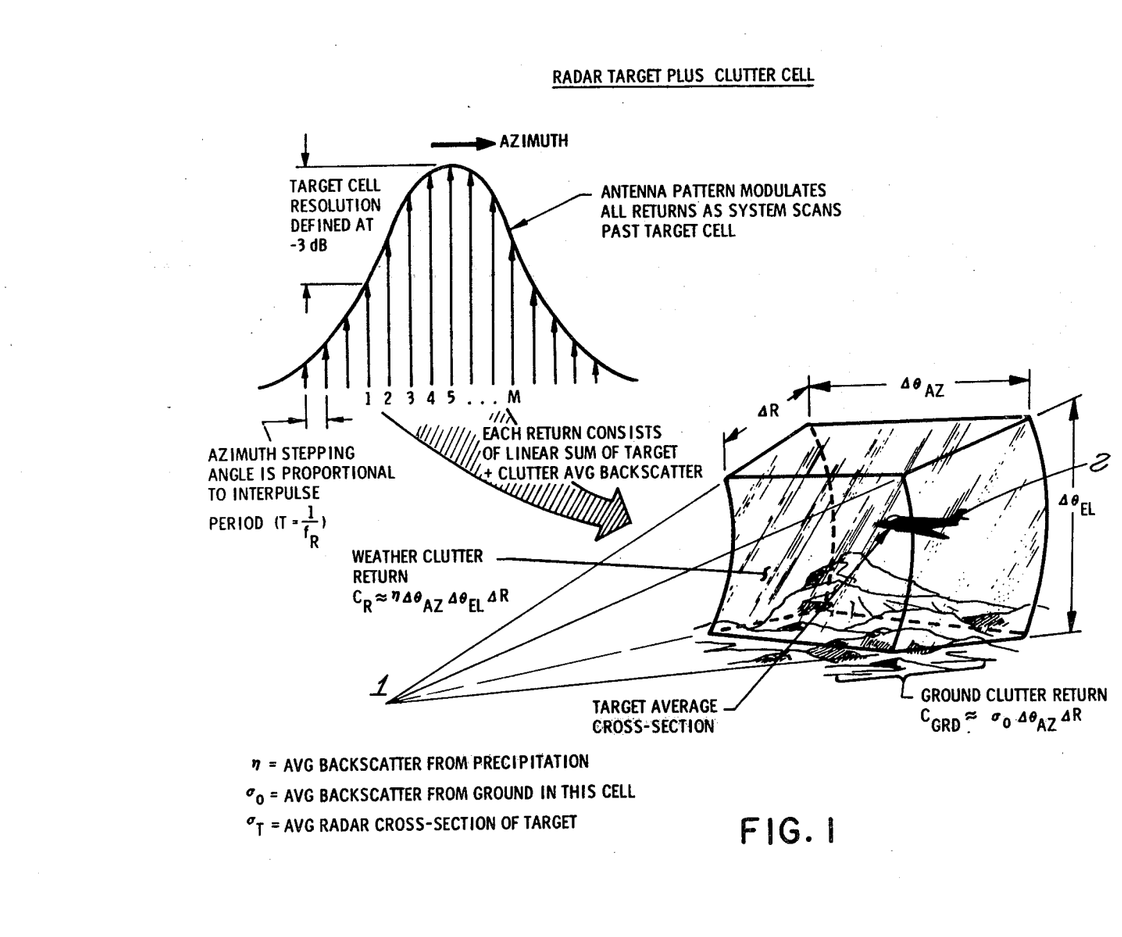
FIG. 1 is a pictorial representation of a radar target in the presence of multiple clutter types within a target cell being scanned by the radar system.

Referring now to FIG. 1, there is shown a radar target 2 in a target cell. The radar set is located at reference numeral 1 and typically scans the horizon azimuthally as well as in elevation. The target cell is defined here by the range bin size, $\Delta R$, as well as by the elevation window $\Delta\theta_{EL}$, and by the azimuth window $\Delta\theta_{AZ}$. The size of the target cell depends upon several factors, including the radar type and the processing techniques used. Radars having excellent elevation and azimuthal sensitivity include the so-called "pencil beam" radars which can emit a beam having a cross section of about 1° in azimuth as well as elevation. Thus the elevation and azimuth windows have the same general dimensions. The range bin is a function of the shortness of the radar burst; however, it is also well known to use pulse compression techniques with longer pulses to effectively shorten the range bin. In this respect, it has been known to use radar pulses comprising a plurality of individual segments whose phases are varied in a predetermined fashion. Using such techniques, the location of a target may be determined with high accuracy.

In addition to the return from the target 2 in FIG. 1, returns are also received from ground objects such as buildings, mountains, trees and other fixed objects. This return is known as the ground clutter return. Returns may also be received from natural phenomena such as rain and man-made chaff which may exist in the atmosphere above ground level. Additionally, electronic counter measures (ECM), such as jamming, may be aimed at the radar system and displayed or interpreted as a radar return. The radar should be capable of accurately locating and finding the target while ignoring returns from ground clutter and sky clutter. It should also preferably be capable of utilizing electronic counter-counter measures (ECCM) when ECM is encountered.

Figure 2:
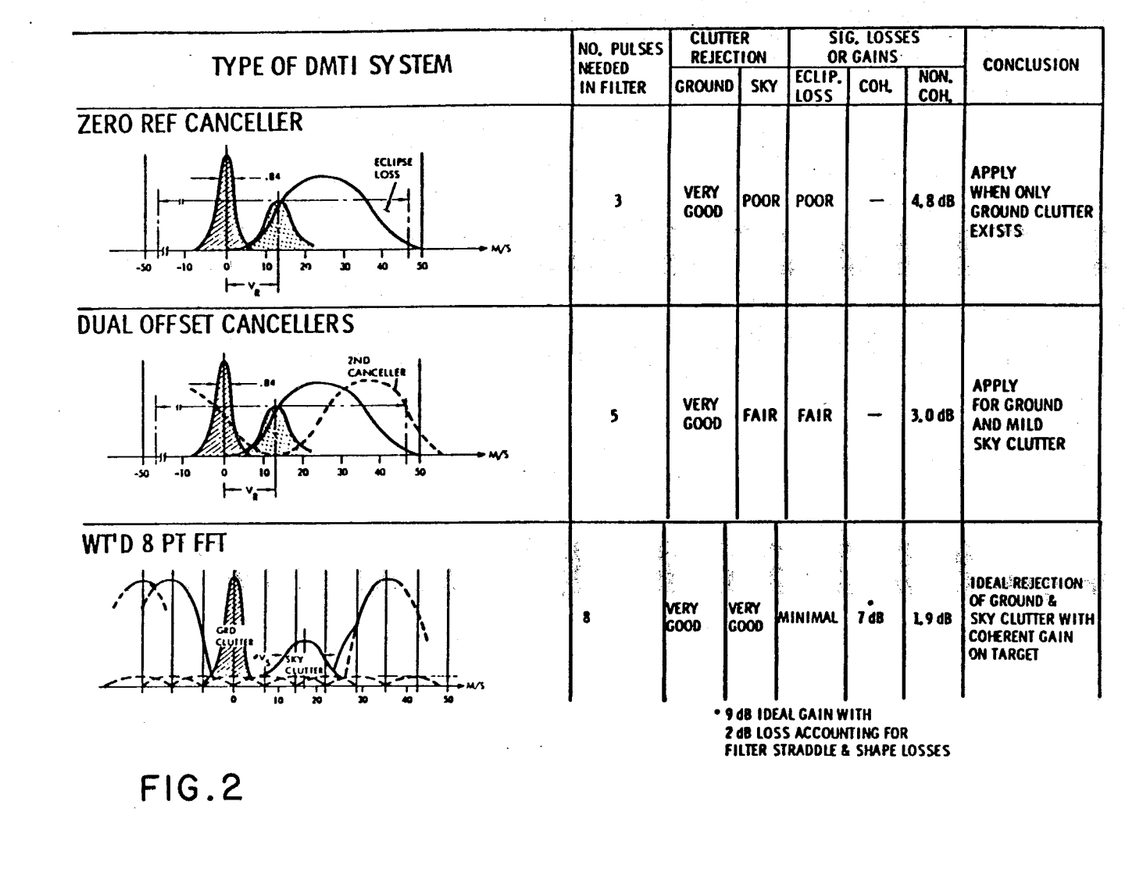
FIG. 2 sets forth in pictorial form the trade-offs for basic MTI, dual offset MTI and FFT MTI radars.

Prior art radar sets have worked relatively well at rejecting ground clutter, but have not been nearly so effective at rejecting sky clutter or using ECCM without operator intervention. The reason for the loss of effectiveness against sky clutter can be seen by referring to FIG. 2 wherein various types of existing digital MTI systems, as well as some of their advantages and disadvantages are described. The "zero reference canceller" radar, which employs the aforementioned notched filter, is effective for rejecting ground clutter because ground clutter returns have almost no phase shift change from pulse to pulse due to the generally fixed locations of the clutter and the radar transmitter. Of course, a moving radar transmitter would impose a known phase shift on the ground clutter which would be dependent upon the speed of the transmitter as well as the direction travelled with respect to the ground clutter being observed. This known phase shift could be accounted for by appropriate selection of the notched filter. However, assuming a fixed transmitter, the ground clutter still can have a phase shift associated with it due to trees and the motion of the antenna scanning past fixed objects. Thus, in FIG. 2, the ground clutter is shown over a small phase shift about zero. Typical prior art notched filter MTI systems are effective in rejecting such ground clutter.

Sky clutter, on the other hand, is a different matter because wind may have fairly high velocity, especially, for example, in the midst of a rain squall. Should a rain squall having a radial velocity of 12 meters per second, for example, occur within the target cell under examination, then a return signal spectrum, such as that shown for the sky clutter in FIG. 2, would occur. This return typically cannot be filtered out by a normal fixed MTI filter. As can also be seen in FIG. 2, "dual offset cancellers," i.e., two fixed filters, one capable of being offset, are more effective against sky clutter than the zero reference canceller; however, high performance MTI systems based on near optimal narrow band filtering techniques, implemented by such techniques as Fixed Impulse Response (FIR) filters or weighted Fast Fourier Transform (FFT) processing, yield superior results against both ground and sky clutter which are typically referred to collectively as bimodal clutter. The use of high performance MTI, such as FIR or FFT MTI, or even dual offset canceller MTI, has a serious drawback if it is used against sky clutter over the entire spatial coverage area of the 3D radar system. This drawback will subsequently be discussed with reference to FIG. 6.

Figure 3:
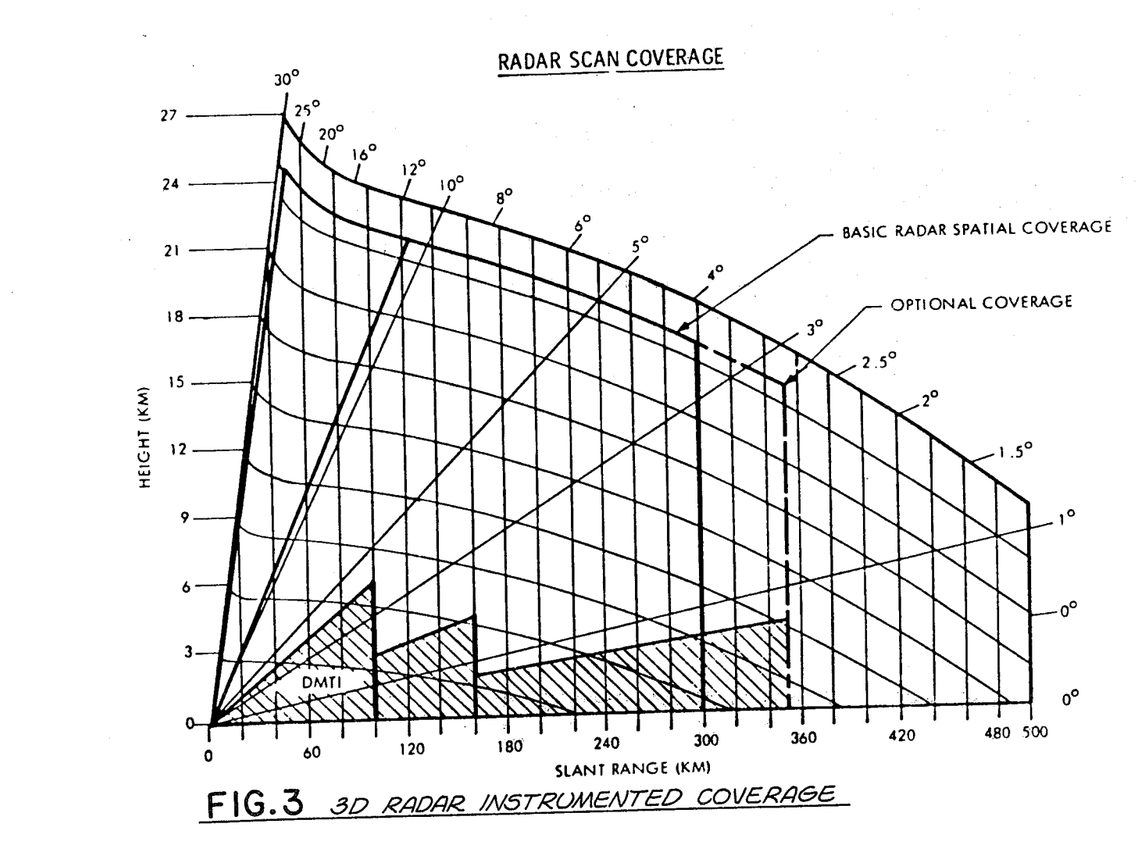
FIG. 3 shows typical radar instrumented coverage or radar scan coverage for a radar system as well as areas for which MTI may be typically used to eliminate ground clutter.

Referring now to FIG. 3, there is shown pictorially the coverage diagram of a typical radar system. MTI processing techniques are generally employed only for lower elevation angles and in the shorter slant range distances. MTI is not needed at elevations greater than four or five degrees because of the lack of ground clutter at those elevations nor is it needed for distances much greater than 100 kilometers because of the curvature of the earth taking ground clutter out of the slant range of the radar system. Furthermore, MTI is preferably only used when necessary because MTI filters out targets moving circumferentially with respect to the transmitter and targets having a radial velocity which produces a spectral line at either 0, F, 2F, 3F . . . , nF. These speeds are referred to as blind speeds for MTI systems (see Skolnik, Section 17.2).

Figure 4:
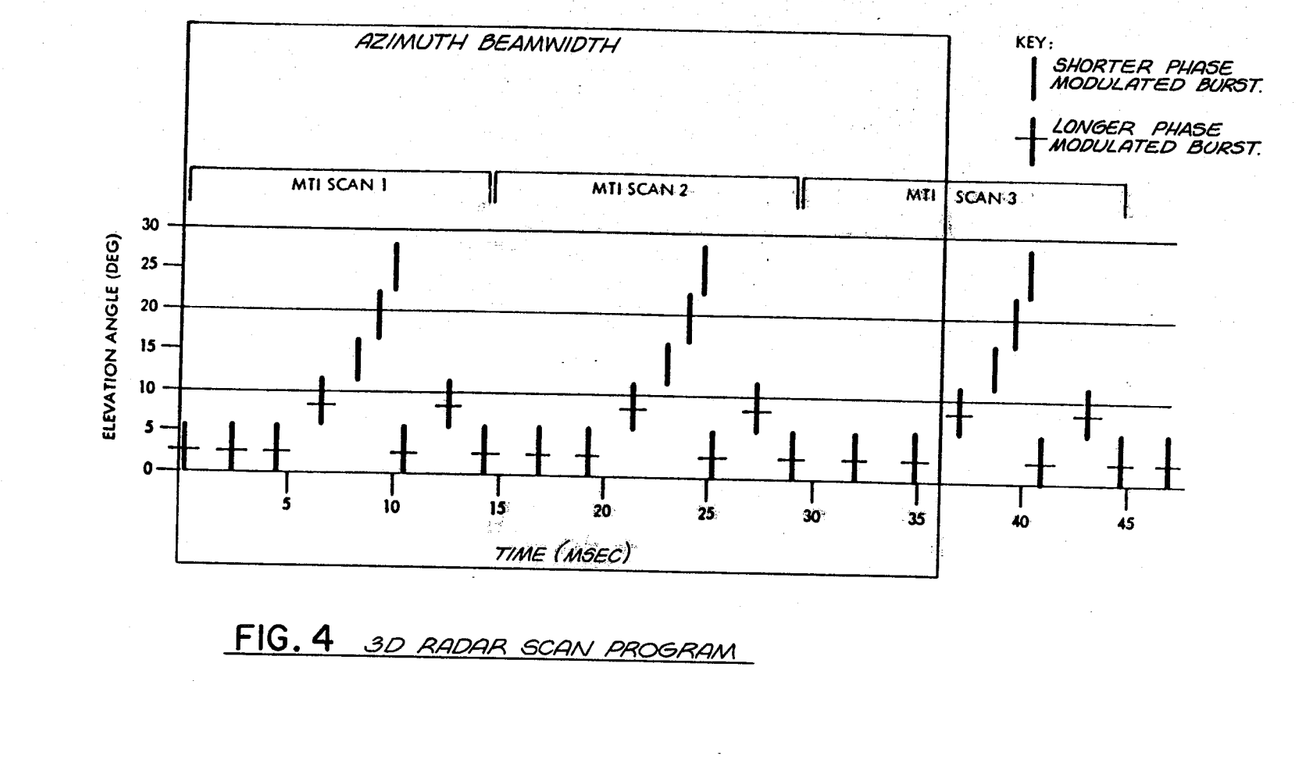
FIG. 4 is a typical radar scan program employing MTI scan techniques through the lowest elevation angles.

In FIG. 3, it should be noted that the desired detection range of the radar system is typically greater at low elevations than at high elevations due to the effect of the earth's curvature and the fact that targets are not expected to be found at heights greater than about 25 kilometers. For this reason, the Pulse Repetition Frequency (PRF) may be higher at the higher elevations. To obtain more energy on a target at the lower elevations, a longer phase modulated burst may be used compared to the phase modulated bursts used at higher elevations. The effect of these considerations may be seen in FIG. 4 where the scan program for a three dimensional radar system is shown. The short vertical lines which subtend approximately five degrees indicate five essentially simultaneous beams, the beams having slightly different frequencies associated therewith such that when a pencil beam radar wave is emitted from a frequency sensitive antenna, five or so separate pencil beams may be emitted, thereby obtaining approximately five degrees elevation coverage from this multiple beam pulse. After each pulse there occurs an interval of time on the order of two to five milliseconds during which time the radar listens for return echos. The listening time is greater at lower elevations than higher elevations due to the greater slant range desired of the radar set at lower elevations than at higher elevations, as aforementioned. Also, due to the fact that MTI processing is usually desired at lower elevations and assuming a zero reference canceller is used to do this MTI, three consecutive pulses are used for analysis in the notched filter (see FIG. 2). At the higher elevations, that is, above five degrees, no such MTI processing is done and therefore single pulses are shown in these elevations.

Figure 5:
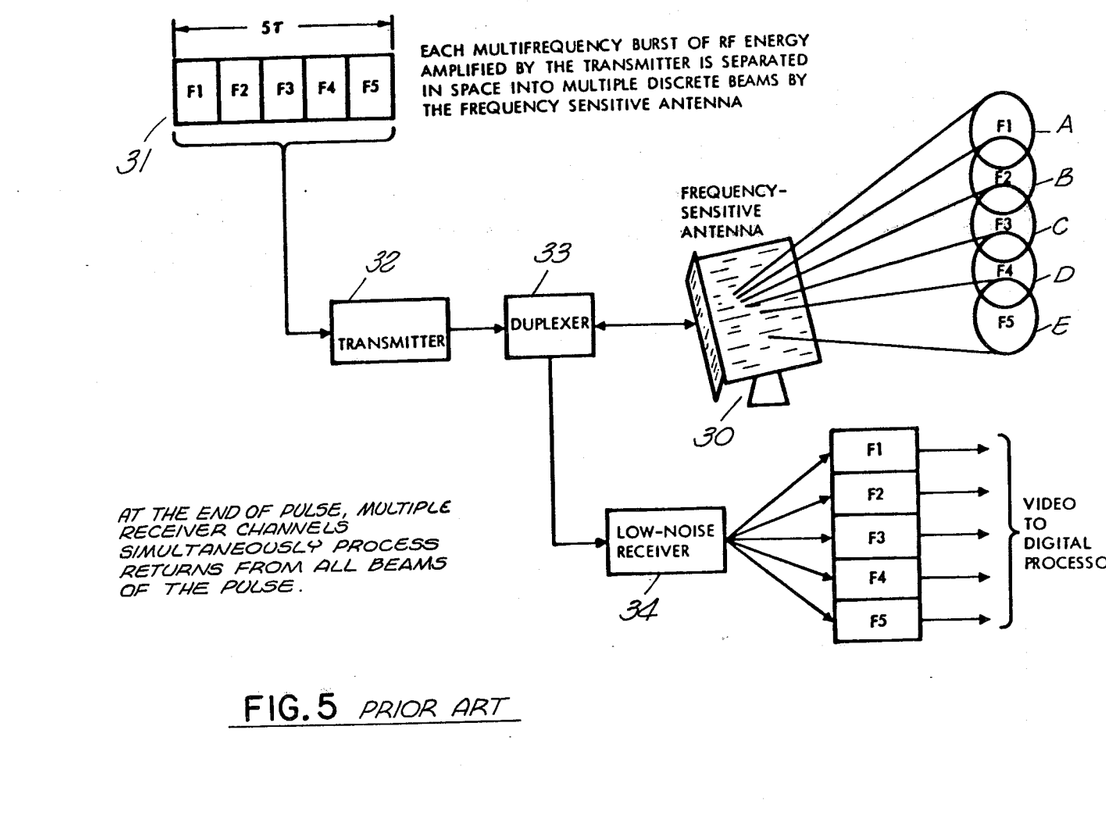
FIG. 5 shows conventional front end equipment for a pencil beam radar.

Referring now to FIG. 5, there is shown the front end equipment of a conventional pencil beam radar system. The radar system shown in FIG. 5 employs five beams which are emitted from frequency-sensitive antenna 30. These five pencil beams are emitted one right after another, the five beams comprising a radar pulse. The RF energy in each beam is preferably phase modulated to improve range sensitivity of the radar system as aforementioned and a slightly different carrier frequency is associated therewith, thereby permitting antenna 30 to alter the elevation of the beam in response to the frequency shift occurring between the packets of RF energy in a radar pulse. Thus, the RF energy applied to transmitter 32 is shown at numeral 31 comprising packets F1–F5, each of which has a slightly different carrier frequency and each of which is preferably phase modulated. Echo returns are received by antenna 30 during the interpulse period and applied via duplexer 33 to receiver 34 where the return information is separated into the five carrier frequencies to obtain five different responses for a given radar pulse.

Figure 6:
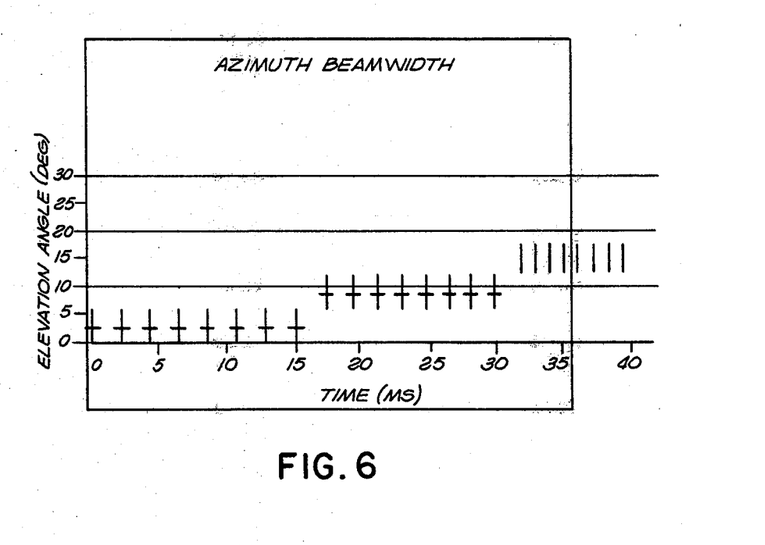
FIG. 6 shows another radar scan program for which FFT processing is used in a non-spatially adaptive manner.

This radar system of FIGS. 1–5 works well against ground clutter but is not capable of rejecting sky clutter for the reasons aforementioned. Of course, a narrow band filter bank is capable of rejecting sky clutter, however, as can be seen from FIG. 6, a scan program which routinely used this technique at all elevations could not scan the desired volume within a relatively small diameter beam because of the number of consecutive pulses (for example, eight as shown in FIG. 6) required for the filter to perform the analysis. Thus, in FIG. 6, a pure narrow band filter scan program only can complete the lower elevation analysis and is blind to targets having an elevation of 15 degrees or greater. Alternatively, a pure narrow band filter scan program utilizing a fast PRF to obtain the desired elevation scan would lose range capabilities.

It is, therefore, one object of this invention to provide a radar system capable of using high order MTI techniques, such as narrow band filtering, only where needed to reduce clutter.

It is another object of this invention to provide a radar system with a mechanism for employing narrow band filtering to accomplish near optimal filtering against the encountered environment using a measured correlation coefficient as a control mechanism for selecting the narrow band filter bank to be used.

It is yet another object of this invention that the measured correlation coefficient be used to determine the order of the filter bank (i.e., the number of filters used).

It is another object of this invention to develop a go/no-go test to be used for invoking ECCM techniques against not highly correlated clutter-like returns not removed by the normal fixed filter MTI.

It is yet another object of this invention that the use of high order MTI filtering techniques should not restrict the elevation or range coverage of the radar system.

BRIEF DESCRIPTION OF THE INVENTION

The foregoing objects are achieved as now described. A conventional radar system having conventional MTI as well as non-MTI processing typically produces quadrature signals from the phase detectors thereof. The quadrature signals are applied to an autocorrelation estimation processor which correlates the quadrature signals received from two adjacent pairs of pulses which pairs of pulses preferably may be transmitted at all elevations of interest. The autocorrelation estimator is coupled to a severe background sensor which uses the correlation coefficient estimated by the autocorrelation estimator to select the appropriate processing, i.e., ECCM when not highly correlated or the appropriate number of filters when the clutter is correlated (higher order MTI processing).

The high order MTI processing may comprise, for example, a group of several pulses, the echos from which are analyzed using narrow band filters. The status of the ranges, elevations and azimuthal sectors for which high performance MTI processing is desired is maintained in a clutter map similar to the clutter maps maintained for normal MTI processing. Similarly, the order (i.e., number of filters or which filter bank is to be used) of the higher MTI process is maintained. The use of a clutter map to store this information allows the processor to adapt to the changing conditions because the clutter map is continually updated on a scan-to-scan basis.

The autocorrelation estimator processor preferably includes an estimated autocorrelation function circuit comprising a pair of delay circuits, a pair of multiplier circuits, a pair of averaging circuits, a pair of squaring circuits, an adder circuit and a square root circuit (or an approximation thereto). The I in phase signal is supplied in both undelayed and delayed form to one of the multipliers which multiplies the delayed and undelayed components of the I signal together. The I in phase signal in undelayed form is multiplied by the Q quadrature signal in undelayed form by the other multiplier. The outputs of the multipliers are averaged over a number of echos and then the averaged outputs are squared and their squares added together. The square root is taken of the sum by the square root circuit. The correlation estimation processor also preferably includes an estimated clutter power measuring circuit which squares the I and Q signals, sums the results of the squaring operation and averages the sums over the echos. Also preferably included in the correlation estimator processor is an estimated noise power measuring circuit comprising a detector for detecting the I and Q signals during a radar system dead time such that the I and Q signals then include system noise but no target information. These I and Q signals are applied to squaring circuits, the outputs of which are applied to an adder. The sum of the squares from the adder are applied to an averaging circuit to obtain an average noise power result. The output of the estimated noise power measuring circuit is subtracted from the output of the estimated clutter power measuring circuit in a subtraction circuit. The output of the estimated autocorrelation function circuit is applied to a dividing circuit wherein the output of the estimated autocorrelation function circuit is divided by the output from the subtraction circuit to provide an output indicative of the correlation of the clutter being observed by the radar system. Of course, in certain applications having low noise characteristics, it may be desirable to eliminate the noise power measuring circuit and the subtraction circuit if the error caused thereby is tolerable. In this case, the output of the estimated autocorrelation function circuit is divided by the output of the estimated clutter power measuring circuit.

The calculated correlation coefficient is preferably supplied to the severe background sensor wherein the appropriate MTI processing is selected for the clutter conditions encountered. One technique for making the selection is using a stored look-up table for selecting the appropriate filter bank from those available based on the value of the correlation coefficient. Of course, as a matter of design choice, some practicing the present invention may wish only to apply the "go/no-go" test to the calculated correlation coefficient for determining whether a preselected high order MTI filter bank should be used against the returns.

Additionally, the severe background sensor is preferably coupled to an ECCM controller for invoking known ECCM techniques whenever the calculated correlation coefficient indicates that the clutter-like returns are not well correlated.

The advantages of the invention both as to its construction and mode of operation, and the preferred mode of use, will be readily appreciated by reference to the following detailed description when considered in connection with the accompanying drawings in which like reference numbers refere to like parts throughout the drawings.

DETAILED DESCRIPTION

Figure 7:
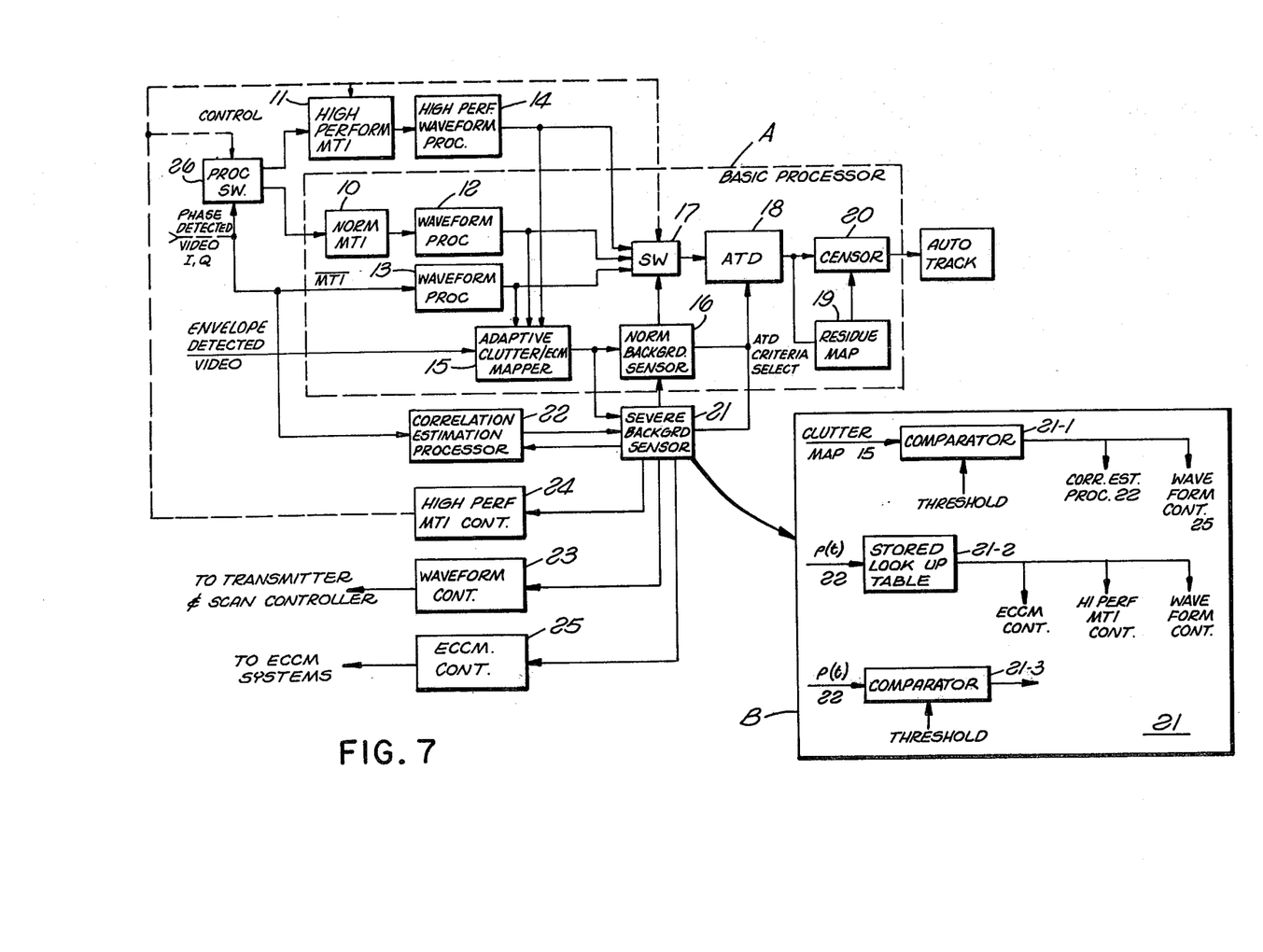
FIG. 7 is a simplified block diagram of a radar signal processor employing the present invention.

FIGS. 1–6 have already been discussed under "Background of the Invention." Inasmuch as FIGS. 1–6 relate to prior radar systems and disadvantages thereof compared to the present invention, this detailed description of the invention begins with FIG. 7.

FIG. 7 is a simplified block diagram of a basic radar signal processor which employs the present invention. That portion of the basic radar signal processor of FIG. 7 encompassed by the dash line, reference A, generally corresponds to the signal processor of a conventional fixed filter MTI radar of the type previously described in "Background of the Invention." It will become apparent to those skilled in the art, moreover, that various changes may be made to the basic processor which have no effect upon the use of our invention described herein. For example, those skilled in the art will realize that the residue map may be incorporated with the clutter map, if desired, and that the waveform processing may be time-shared between the MTI and $\overline{\text{MTI}}$ channels and- /or performed before the normal MTI function, if desired. Furthermore, other modifications will be appreciated by those skilled in the art.

Referring now to FIG. 7, phase detected video, that is the I and Q quadrature signals, are used for non-MTI ($\overline{MTI}$) radar, normal MTI radar, and high performance MTI radar. The phase detected video signals may be obtained, for instance, for radar circuitry such as that shown in FIG. 2 of U.S. Pat. No. 3,725,923, wherein the I in phase signal corresponds to signal Ss, and the Q quadrature signal corresponds to signal Sc of the aforementioned U.S. patent.

In a conventional radar processor, whether or not the phase detected video is filtered using an MTI filter, such as normal MTI filter 10, is determined according to the contents of a clutter map similar to adaptive clutter-/ECM mapper 15. Typical clutter maps employ a number of memory elements, the number being as great as the number of target cells (which are shown in FIG. 1) which occur within the radar coverage volume. The memories in the map 15 are typically incremented by a relatively large number, say 5, for each hit (echo) and decremented by a relatively small number, say 1, for each miss. The normal background sensor 16 includes a threshold detector for controlling switches 17 and 26 to invoke normal MTI processing when the threshold is exceeded. This occurs when hits frequently occur in the same target cell. If the hit is caused by ground clutter, invoking MTI processing should be effective for removing it or reducing it to an acceptable level.

Of course, the number of memory elements in map 15 may be substantially reduced by making the map coarser with respect to range and/or azimuth and/or elevation compared to the size of a target cell.

The normal MTI filter 10 may be provided by a notched zero reference filter, a dual delay canceller or even an FIR or FFT filter or other filter. Waveform processors 12 and 13 perform pulse compression operations when the transmitted pulse is either phase or frequency modulated. The automatic target detector 18 may be used, if desired, to futher reduce unwanted responses. Detector 18 may comprise, for example, a dual thresholding device in which a second threshold crossing is declared if in "X" opportunities at least "Y" primary threshold crossings are observed. "X" may comprise a continuous grouping of positions in azimuth and elevation that slides in both angular dimensions. Furthermore, the well known concept of a residue map 19 and censor 20 may be additionally used, if desired, to further reduce false alarms by the radar system.

That portion of the radar system enclosed by Reference A has now been described and it will be appreciated by those skilled in the art that this radar system generally corresponds to the radar system previously described under "Background of the Invention." Furthermore, the normal MTI fitler 10 will probably be unable to eliminate sky clutter particularly in a 3D system. Since sky clutter generally satisfies the detection criteria of detector 18, sky clutter, if it is removed at all, will be removed by the action of residue map 19 and censor 20. However, since the censor literally censors responses from the target cells in which sky clutter is observed, any target also existing in the sky clutter will likewise be censored by a conventional radar processor of the type enclosed within the reference A line. As will be seen, our spatially adapted high performance MTI radar system permits the radar system to detect targets amongst sky clutter without affecting the radar's range, azimuth or elevation detection capabilities, or to invoke ECCM techniques when ECM is detected.

Sky clutter is typically well correlated over reasonable ranges, elevations, and azimuth sectors as described in "Radar Design Principles" by F. E. Nathanson at pages 192–227. The fact that sky clutter, such as rain or chaff, is reasonably well correlated may be used in connection with a correlation estimation processor to determine whether an area of radar returns is sky clutter. The measurement of the correlation coefficient provides the necessary data either to select the order of the high performance narrow band MTI filtering technique to be used or merely as a "go/no-go test" for invoking a predetermined high performance MTI filtering technique. Either technique should be capable of reducing such sky clutter returns without unduly affecting typical target returns. Since high performance narrow band MTI filtering typically requires more pulses to provide sufficient data to perform the MTI filtering, it is undesirable to invoke high performance MTI either where unnecessary or against returns for which it will be ineffective since, as has been mentioned with reference to FIG. 6, invoking having performance MTI tends to reduce amount of information otherwise available from other elevations, azimuths and/or ranges.

The severe background sensor 21 typically receives an output from adaptive clutter mapper 15 and senses returns for which normal MTI has been ineffective in reducing clutter. Thus, severe background sensor 21 may employ a threshold detector 21-1 similar to that used in normal background sensor 16, but having a higher threshold level for (1) enabling the correlation estimated processor 22 and (2) for causing the transmitter to output a special correlation pulse pattern in the area of clutter. Detector 21-1 is shown within block, reference B, which shows the sensor 21 in greater detail. Return echos from the special pulse pattern are processed in the correlation estimator processor 22. The special pulse pattern used during correlation processing is described with reference to FIG. 8 and is generated by the radar transmitter as controlled by the special waveform controller 23. In addition to controlling the transmitter during correlation processing, waveform controller 23 also preferably controls the transmitter to output the necessary number of radar pulses during high performance MTI processing.

As will be discussed shortly, processor 22 outputs an estimated correlation coefficient p(T) when enabled by sensor 21, which coefficient may vary over a range of values. The computed value of p(T) may be applied either to a stored look-up table 21-2 or to a comparator 21-3 for accomplishing a "go/no-go test" or other such circuit means for testing the value of p(T). We preferably use a stored look-up table which, for instance, may be stored in a read-only-memory (ROM), a random-access-memory (RAM) or other such memory means, because the stored look-up table easily permits the selective invoking of different orders of narrow band filters as a function of the calculated p(T) of the high performance MTI processing. Thus, a high performance MTI controller is responsive to either the stored look-up table 21-2 or comparator 21-3 in sensor 21 for controlling switches 17 and 26 to invoke high performance filter 11. Waveform processor 14 coupled to the output of MTI filter 11 performs the pulse compression operation if desired and may be coupled instead to the input of MTI filter 11 in much the same manner as processor 12 and normal MTI filter 10, as aforementioned. ECCM controller 25 will be discussed subsequently.

Figure 8:
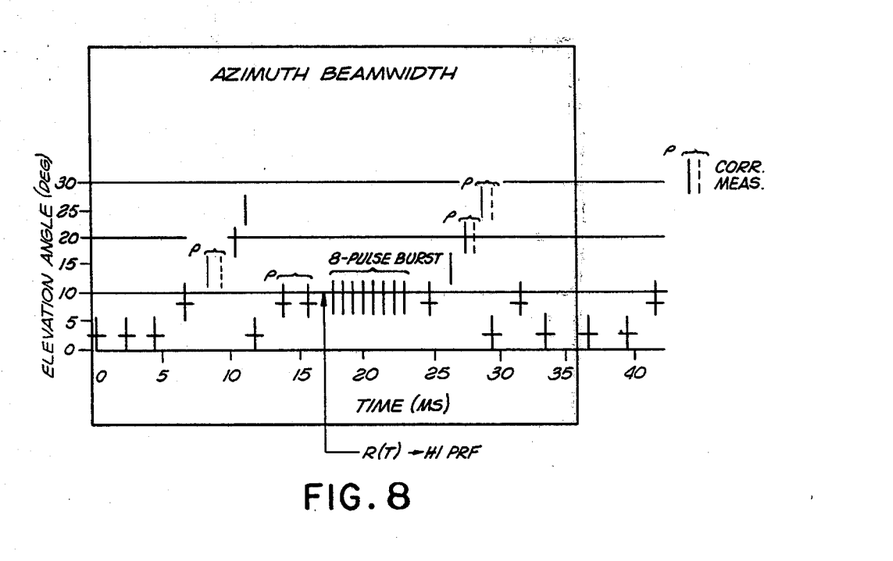
FIG. 8 is a radar scan program which may be used with the processor of FIG. 6.

Referring now to FIG. 8, there is shown a diagram of a scan program for our spatially adaptive MTI three dimensional radar through an azimuth window. Again, as in FIGS. 4 and 5, the short vertical lines indicate a multiple pulse comprising five or so separate pencil beams of the type shown, for example, in FIG. 5. Those skilled in the art will realize, moreover, that the number of pencil beams used is a design choice.

In FIG. 8 there is shown several pulse pairs denoted by the letter P. These pulse pairs are the special waveform used for correlation processing. As aforementioned, the transmission of these pulse pair special waveforms is controlled by severe background sensor 21 (FIG. 7). As is discussed subsequently in greater detail, the returns or echos from a plurality of pulse pairs is processed in the correlation estimator processor 22 (FIG. 7). Each pulse pair is preferably transmitted at the PRF and the period between pulse pairs is T, the interpulse period. Assuming that the plurality of pulse pairs has been transmitted, that the correlation estimator processor has determined the correlation of the returns, and that the severe background sensor has selected the order of the near optimal high performance MTI processing, then waveform controller 23 causes the radar transmitter to transmit a high performance MTI waveform of the appropriate number of pulses, such as, for example, the eight pulse burst shown in FIG. 7 for processing by eight narrow band filters.

As can be seen from FIG. 8, high order MTI processing is being invoked (in this example) in the elevation range from approximately six to twelve degrees. However, high order MTI processing may preferably be invoked over any necessary elevation range within the radar's scan coverage. Furthermore, it can be seen that the interpulse period for the eight pulse burst is shown to be shorter than the normal interpulse period for this elevation. This shortening of the interpulse period for the eight pulse burst may be accomplished, if desired, because range information is already known based upon echos received during the normal scan or pulse pair scan in this elevation range. Furthermore, shortening of the interpulse period for the eight pulse burst tends to mitigate the degradation in overall data rate occurring due to the shift to high order MTI processing. This can be seen by comparing FIG. 8 with FIG. 6 in the six to twelve degree elevation range, for example, inasmuch as in FIG. 6 the eight pulse burst requires more time for transmission than the eight pulse burst in FIG. 8. Regardless, it can again be seen that it is undesirable to invoke high order MTI processing either where the processing is unnecessary or where the processing is not capable of removing undesirable returns. For example, high order MTI processing is generally ineffective against electronic counter measures (ECM) and since ECM signals are generally poorly correlated, our spatially adaptive MTI radar system is capable of differentiating between ECM and sky clutter returns. Thus, high order MTI processing is preferably invoked against sky clutter and electronic counter-counter measure (ECCM) techniques known in the art are selectively applied against poorly correlated ECM sources through the control of the severe background sensor 21.

Thus turning again to FIG. 7, an output of sensor 21 is preferably applied to an ECCM controller 25 for invoking ECCM techniques whenever poorly correlated clutter-like returns are detected.

Figure 9:
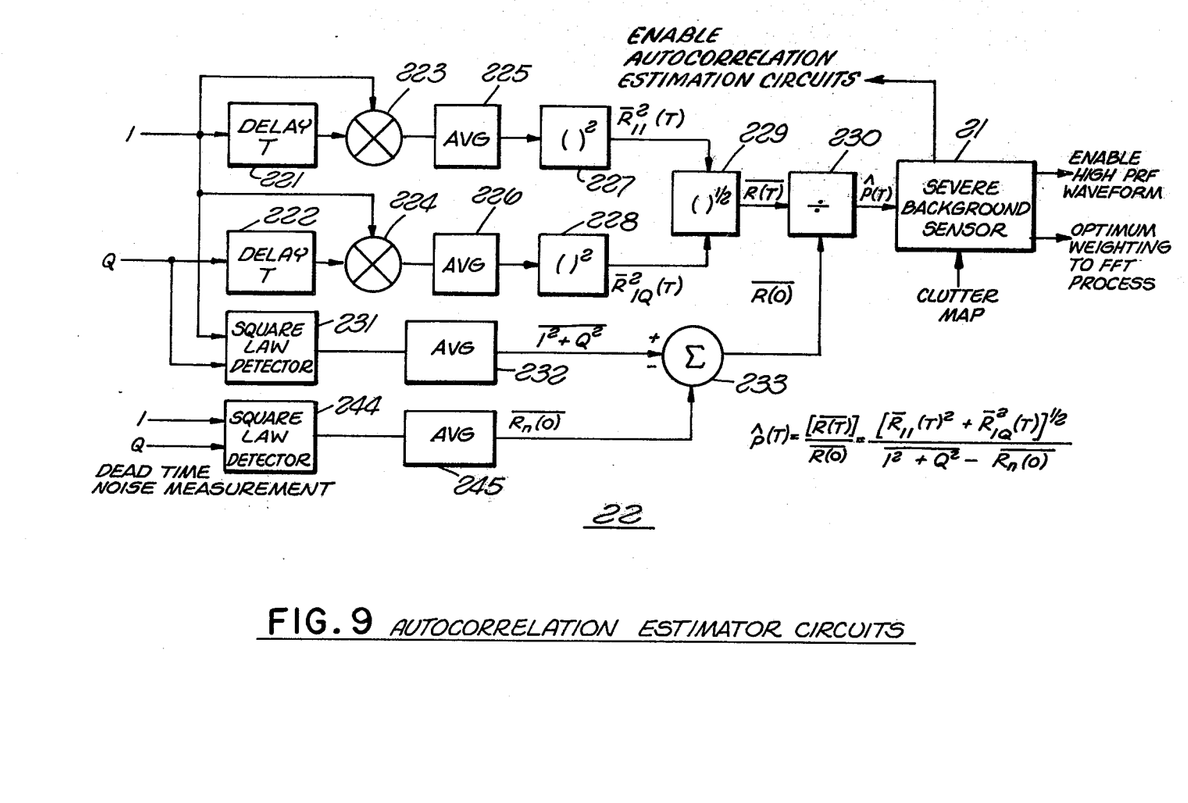
FIG. 9 is a block diagram of the correlation estimation processor.

FIG. 9 is a simplified block diagram of the correlation estimation processor 22 of FIG. 7 and Table 1 lists the equations solved by processor 22. Referring now to FIG. 9, the aforementioned I and Q quadrature signals are applied to a square law detector circuit 231 which squares the I and Q signals and sums the result of the squaring operation. The I in phase signal is also applied to a delay circuit 221 and to multipliers 223 and 224. The Q quadrature signal is also applied to a delay circuit 222. Multiplier 223, besides receiving the I in phase signal directly, also receives the I in phase signal in delayed form via delay circuit 221. Multiplier 224, besides receiving the I in phase signal, receives the Q quadrature signal, in delayed form, via delay circuit 222.

The outputs of multipliers 223 and 224 are applied to respective averaging circuits 225 and 226 which average the outputs of multipliers 223 and 224 over a plurality of returns. After averaging over the plurality of returns, the results from averaging circuits 225 and 226 are squared in respective squaring circuits 227 and 228 and then supplied to circuit 229 which sums the outputs from squaring circuits 227 and 228 and takes the square root of the sum. The output of circuit 229 is applied to a divider circuit 230.

The output of square law detector 231 is applied to an averaging circuit 232, which averages the results from detector 231 over the same plurality of returns used for averaging in circuits 225 and 226. The output of averaging circuit 232 is applied to a subtractor 233.

The I and Q quadrature signals are preferably sampled in a square law detector 244 during radar system dead time, whereby the I and Q quadrature signals then reflect a measure of system noise but contain no echo or return information. Detector 244 is similar to detector 231 in that the respective I and Q quadrature signals are squared and the sum taken of the squares. The results from detector 244 are applied to averaging circuit 245 to obtain a figure of system noise. The output of averaging circuit 245 is also applied to subtraction circuit 233 for subtracting the output of averaging circuit 245 from the output of averaging circuit 232. The results from subtraction circuit 233 are supplied to division circuit 230 whereat the results from circuit 229 are divided by the results from subtraction circuit 233. The output from division circuit 230 is an estimation of the correlation coefficient, p(T), which is supplied to severe background sensor 21. Severe background sensor 21, besides being responsive to map 15 for invoking out autocorrelation estimation processing, is further responsive to output of division circuit 230 using the value p(T) to select the order of the filter bank (i.e., number of filters) to be used as the best estimate of a near optimum filter bank against the measured clutter environment. One circuit for accomplishing this selection is stored in lookup table 21-2 which uses the value p(T) to select the appropriate bank from among those available. Preferably, we invoke an eight pulse high performance MTI process whenever p(T) is on the order of 0.7 when the spacing, T, between pulse pairs is on the order of 5 milliseconds. When p(T) is on the order of 0.9 for the same value of T, the processing is preferably increased to 16 pulses or an order of 16. This example was chosen considering an FFT filter bank implementation which we preferably use. However, those skilled in the art will recognize that filter banks of any arbitrary order or orders can be constructed and used, if desired. The number of filter banks, the order of the banks, and the specific values of the correlation coefficient required for the selection of a particular bank are design choices dependent upon the particular radar parameters, the severity of the expected environment and cost of the system. For lower values of p(T), we preferably invoke ECCM techniques.

Comparing FIG. 9 with Table 1, it can be seen that the circuitry of FIG. 9 generally solves the equations of Table 1; however, the estimated clutter power circuit comprising detector 231 and averager 232 have been simplified somewhat inasmuch as only the undelayed forms of the I and Q quadrature signals are processed thereat. We have found that this simplification does not unduly affect the results obtained at divider circuit 230. Moreover, it should be apparent that detector 231 may be modified to be responsive to both the delayed and undelayed I and Q quadrature signals or alternatively be modified to be responsive to delay circuits 221 and 222, as a matter of design choice.

In FIG. 9 and in Table 1, the delay associated with delay circuits 221 and 222 and the delay, represented by T in the estimated autocorrelation function, is the interpulse period T between the pulse pairs P transmitter for autocorrelation purposes and described with reference to FIG. 7. Also, it has been previously mentioned that averaging circuits 225, 226 and 232 average over a plurality of returns, this plurality being represented by N in the equations of Table 1. These returns or samples are the pair of returns received from the transmission of a pulse pair P in any particular radar beam. Preferably, N should be on the order of 30 or more to obtain a large enough number of samples to calculate a good correlation coefficient for the samples involved; however, fewer samples may be employed in certain applications wherein the degradation in the quality of the calculated correlation coefficient is acceptable. However, when we practice our invention we preferably use 30 samples.

These samples are taken over slight variations in one or more of the following: range, azimuth, elevation and time. The samples in range may be taken by looking at neighboring range bins, assuming no pulse compression techniques are utilized. However, in most modern radar systems, pulse compression techniques are utilized; therefore, the range bins selected should differ by the distance $\tau$ where $\tau$ equals the number of bits transmitted per beam times the depth of a range bin (which corresponds to the distance travelled by the radar beam during the period of one bit of the pulse coded or frequency modulated radar pulse). Since sky clutter is generally well correlated over a few miles in range, several samples can usually be obtained in range even if pulse compression techniques are utilized. In azimuth, additional samples may be obtained by sampling an adjacent azimuthal beam width. Preferably, additional sampling is not done within one beam width (e.g., approximately one degree for pencil beam radars) since multiple examinations within any given beam width are inherently well correlated and thus such samples are not sufficiently independent for calculating a satisfactory correlation estimation. Similarly, additional samples may be taken in elevation, for example, by sampling either beams A, C and E or B and D if, for example, five pencil beams make up a radar pulse, as shown in FIG. 5. Given the two to one overlap shown in FIG. 5, adjacent beams are preferably not used for sampling by the autocorrelation estimator circuits due to the fact that results from such overlapping beams are not independent, and therefore inherently well correlated. Samples may be taken at different times by sampling during successive scans of the radar over the area of interest.

The foregoing discussion has explained how multiple samples may be obtained by sampling in elevation, range, azimuth or time. These various techniques are multiplicative factors in the overall sampling scheme and thus thirty samples may be easily obtained in a single scan of the radar, for example, by selecting five increments of range, three increments of elevation and two increments of azimuth for correlation processing. Of course, innumerable other sampling schemes may be devised by those skilled in the art for use with our invention.

The correlation estimation processor 22 of FIG. 7 may be implemented using standard digital circuit techniques known in the art. However, when practicing our invention, we prefer to calculate p(T) using an appropriately programmed microprocessor of the type preferably implemented on one or a small number of semiconductive chips employing large scale integration technology. Of course, those skilled in the art will recognize that an appropriately programmed general or special purpose computer could alternatively be used, if desired.

While the foregoing invention has been described in connection with certain embodiments thereof, certain modifications may now suggest themselves to those skilled in the art. For example, the invention may be used with both pencil and non-pencil beam radars and with radars having differing numbers of pencil beams associated therewith. We preferably practice our invention in connection with a pencil beam radar system since a higher number of independent samples may be received from sky clutter for use in our correlation estimation processor than may be obtained using other radar systems.

Furthermore, it should be recognized that the correlation processor may be used to detect regions of ECM without the necessity of the radar system generating any pulses. Other modifications will now also suggest themselves to those skilled in the art. Thus, the scope of our invention is not to be limited to the specific embodiments described, except as set forth in the appended claims.

TABLE I $$R(T) = \left\{ \frac{4}{N^2} \left[ \sum_{n=1}^{N} I_n(t)I_n(t+T) \right]^2 + \frac{4}{N^2} \left[ \sum_{n=1}^{N} I_n(t)Q_n(t+T) \right]^2 \right\}^{\frac{1}{2}}$$

$$R_c(O) = \frac{1}{2N} \left\{ \sum_{n=1}^{N} I_n^2(t) + Q_n^2(t) + I_n^2(t+T) + Q_n^2(t+T) \right\} - R_n(o)$$

where
| | |
|---|---|
| R(T) | Estimated autocorrelation function |
| $R_c(O)$ | Estimated clutter power |
| $R_n(O)$ | Estimated noise power |
| $I_n$ | Inphase channel samples |
| $Q_n$ | Quadrature channel samples |
| N | Number of samples |
| T | Period between the pulse pairs |
| t | Time |

What is claimed is:

1. In a radar system of the type having a first moving target indicator filter means for suppressing ground clutter returns and a background sensor means for enabling said first filter means in regions of clutter, the improvement comprising: a severe background sensor means for detecting regions of clutter returns not suppressed by said first filter means and for generating a control signal and response thereto; correlation processor means, responsive to said control signal, for calculating the correlation of clutter returns received by said radar system; a second moving target indicator filter means for suppressing sky clutter returns; and means, responsive to the output of said processor means, for enabling said second filter means in those regions wherein the clutter returns exhibit a correlation greater than a first threshold.

2. The radar system according to claim 1, wherein said second filter means includes a plurality of narrow band filters.

3. The radar system according to claim 2, further including a third filter means having a plurality of narrow band filters, said third filter means having more narrow band filters than said second filter means and wherein said enabling means enables said third filter means in those regions when the clutter returns exhibit a correlation greater than a second threshold, said second threshold being greater than said first threshold.

4. The radar system according to claims 1 or 3, further including an electronic counter-counter measures system for combating electronic counter measure radiation received by said radar system and means, responsive to the output of said processor means, for enabling said electronic counter-counter measure system in those regions wherein the clutter returns exhibit a correlation less than said first threshold.

5. The radar system according to claim 1, wherein said radar system includes an I and Q phase detected video generator for generating I and Q signals and wherein said processor means includes first and second delay circuits respectfully coupled to said I and Q signals, a first multiplier coupled with the output of said first delay circuit and to said I signal, a second multiplier coupled to the output of said second delay circuit and to said I signal, first and second averaging circuits respectfully coupled to the outputs of said first and second multipliers, first and second squaring circuits respectfully coupled to the outputs of said first and second averaging circuits, a summer and square root circuit coupled to receive the output from said first and second squaring circuits, an estimated clutter power circuit, means coupling said estimated clutter power circuit and said I and Q signals, an estimated noise power circuit, a subtraction circuit for subtracting the output of said estimated noise power circuit from the output of said estimated clutter power circuit and a dividing network for dividing the output of said summer and square root circuit by the output of said subtraction circuit.

6. The radar system according to claim 1, wherein said correlation processor means is provided by an appropriately programmed microprocessor, said microprocessor being implemented by semiconductive means.

7. A Doppler radar system comprising:
   a. a first moving target indicator system for suppressing ground clutter returns received from essentially stationary objects;
   b. a second moving target indicator system for suppressing sky clutter returns;
   c. radar transmitter waveform generating means for transmitting a plurality of pairs of radar beams in response to a control signal;
   d. means associated with said waveform generating means for directing said pairs of beams to different spatial locations in a region of clutter-like returns;
   e. a correlation processor for estimating the correlation of a plurality of returns received in response to said plurality of pairs of transmitted radar beams;
   f. a clutter map;
   g. first sensor means, responsive to the contents of said clutter map, for enabling said first moving target indicator system in response to regions of ground clutter;
   h. second sensor means, responsive to the contents of said clutter map, for generating said control signal in response to regions of clutter-like returns not suppressed by said first moving target indicator system; and
   i. testing means, responsive to the output of said correlation processor, for enabling said second moving target indicator system in those regions where the clutter-like returns exhibit a correlation greater than a first predetermined correlation threshold.

8. The radar system according to claim 7, wherein said second moving target indicator system includes a first plurality of narrow band filters, wherein said radar system further includes a third moving target indicator system, said third system including a second plurality of narrow band filters, said second plurality being greater in number than said first plurality, and wherein said testing means includes means for enabling said third moving target indicator system in those regions where the clutter-like returns exhibit correlation greater than a second predetermined correlation threshold.

9. The radar system according to claim 8, wherein said second predetermined correlation threshold is greater than said first predetermined correlation threshold.

10. The radar system according to claim 9, further including an electronic counter-counter measures system and wherein said testing means includes means for enabling said electronic counter-counter measures system in those regions where the clutter-like returns exhibit a correlation less than said first predetermined correlation threshold.

11. The radar system according to claims 7 or 9, wherein said correlation processor is provided by an appropriately programmed digital data processing device.

12. The radar system according to claims 7 or 9, wherein said correlation processor is provided by an appropriately programmed microprocessor, said microprocessor being implemented by large scale integration semiconductive means.

13. The radar system according to claims 7 or 9, wherein said radar system generates I and Q phase detected video signals and wherein said correlation processor estimates the value of the correlation of a plurality of said plurality of pairs of transmitted radar beams by circuit means responsive to said I and Q signals.

14. The radar system according to claim 13, wherein said circuit means comprises:
   a. first and second delay circuits respectively coupled to receive said I and Q signals;

b. a first multiplier coupled to the output of said first delay circuit and to receive said I signal;
c. a second multiplier coupled to the output of said second delay circuit and to receive said I signal;
d. first and second averaging circuits respectively coupled to the outputs of said first and second multipliers;
e. first and second squaring circuits respectively coupled to the outputs of said first and second averaging circuits;
f. a summer and square root circuit coupled to the outputs of said first and second squaring circuits;
g. an estimated clutter power circuit;
h. means for coupling said estimated clutter power circuit to receive said I and Q signals;
i. an estimated noise power circuit;
j. a subtraction circuit for subtracting the output of said estimated noise power circuit from the output of said estimated clutter power circuit; and
k. a dividing network for dividing the output of said summer and square root circuit by the output of said subtraction circuit.

* * * * *